United States Patent [19]

Park

[11] Patent Number: 6,078,164

[45] Date of Patent: Jun. 20, 2000

[54] PORTABLE ELECTRONIC APPLIANCE

[75] Inventor: Kwang-Chul Park, Suwon, Rep. of Korea

[73] Assignee: SamSung Electronics Co., Ltd., Suwon, Rep. of Korea

[21] Appl. No.: 09/070,243

[22] Filed: May 1, 1998

[30] Foreign Application Priority Data

May 2, 1997 [KR] Rep. of Korea .......................... 97-9761

[51] Int. Cl.[7] .................................................. H01M 10/46
[52] U.S. Cl. .............................. 320/107; 320/132; 320/149
[58] Field of Search ................................... 320/107, 110, 320/112, 114, 132, 149, DIG. 18, DIG. 21

[56] References Cited

U.S. PATENT DOCUMENTS

| | | |
|---|---|---|
| 4,229,688 | 10/1980 | Knox et al. . |
| 4,737,702 | 4/1988 | Koenck . |
| 4,965,738 | 10/1990 | Bauer et al. . |
| 5,136,620 | 8/1992 | Eaves . |
| 5,250,905 | 10/1993 | Kuo et al. . |
| 5,339,024 | 8/1994 | Kuo et al. . |
| 5,349,282 | 9/1994 | McClure . |
| 5,371,453 | 12/1994 | Fernandez . |
| 5,389,458 | 2/1995 | Weiss et al. . |
| 5,477,129 | 12/1995 | Myslinski . |
| 5,496,658 | 3/1996 | Hein et al. . |
| 5,557,188 | 9/1996 | Piercey . |
| 5,582,928 | 12/1996 | Farley . |
| 5,635,813 | 6/1997 | Shiga et al. . |
| 5,645,949 | 7/1997 | Young . |
| 5,680,027 | 10/1997 | Hiratsuka et al. . |

*Primary Examiner*—Edward H. Tso
*Attorney, Agent, or Firm*—Robert E. Bushnell, Esq.

[57] ABSTRACT

A portable electronic appliance, such as a portable computer, includes a battery receiving room, disposed within the main body, and a switching device for allowing a user to check the battery capacity outside of the appliance without removing the battery from the appliance. The battery, detachably installed in the room, has both a battery checking switch and a capacity display on one surface thereof. The battery checking switch is selectively operated outside of the appliance, while the capacity display is selectively operated in conjunction with the battery checking switch so as to display the battery capacity thereon. A window is formed on the battery receiving room at a position corresponding to the capacity display, thus allowing a user to check the battery capacity outside of the appliance by viewing the capacity display through the window.

18 Claims, 4 Drawing Sheets

PORTABLE ELECTRONIC APPLIANCE

CLAIM OF PRIORITY

This application makes reference to, incorporates the same herein, and claims all benefits accruing under 35 U.S.C. §119 from an application for PORTABLE ELECTRONIC APPLIANCE earlier filed in the Korean Industrial Property Office on the 2$^{nd}$ of May 1997 and there duly assigned Ser. No. 9761/97.

BACKGROUND OF THE INVENTION

1. Field of the Invention

The present invention relates, in general, to portable electronic appliances and, more particularly, to a portable computer provided with a switching device capable of allowing a user to easily check the battery capacity outside of the computer without removing the battery from the computer, thus being convenient to the user.

2. Description of the Related Art

As well know to those skilled in the art, portable electronic appliances, such as portable computers, are typically designed to be light and small enough to be easily carried or moved by users. Thus, such portable computers are provided with batteries allowing users to easily use the computers in cars or airplanes without supplying external electric power to the computers.

Such an earlier portable computer typically comprises a main body, a battery receiving room formed within the main body and a battery installed in the battery receiving room. When external electric power can not be supplied to the portable computer, the electric power of the internal battery is supplied to the computer.

In such a case, the portable computer may not operate due to the lack of capacity of the battery. Accordingly, it is necessary for a user to check the battery when a user operates the computer.

The checking of the battery capacity is described below. First, the user operates the keyboard of the computer after booting the computer, thus causing the battery capacity to be displayed on the monitor of the computer. Second, the battery is removed from the computer. Thereafter, the capacity of the removed battery is measured by an additional measuring device. Therefore, the above-mentioned earlier method of checking the battery capacity not convenient to users.

The following patents each disclose features in common with the present invention but do not teach or suggest a portable electronic appliance provided with a switching device capable of allowing a user to easily check the battery capacity outside of the appliance without removing the battery from the appliance: U.S. Pat. No. 5,635,813 to Shigaet al, entitled Electronic Apparatus, Battery Management System, And Battery Management Method, U.S. Pat. No. 5,680,027 to Hiratsuka et al, entitled Battery Pack Including Internal Capacity Monitor For Monitoring Groups Of Battery Cells, U.S. Pat. No. 5,557,188 to Piercey, entitled Smart Battery System And Interface, U.S. Pat. No. 5,136,620 to Eaves, entitled Battery Charge Cycle Counter, U.S. Pat. No. 4,229,688 to Knox et al., entitled Battery Discharge Indicator, U.S. Pat. No. 4,737,702 to Koenck, entitled Battery Charging Control System Particularly For Hand Held Device, U.S. Pat. No. : 5,371,453 to Fernandez, entitled Battery Charger System With Common Charge And Data Exchange Port, U.S. Pat. No. 5,250,905 to Kuo et at., entitled Battery With Electrochemical Tester, U.S. Pat. No. 5,349,282 to McClure, entitled Battery Charging And Monitoring System, U.S. Pat. No. 4,965,738 to Bauer et al., entitled Intelligent Battery System, U.S. Pat. No. 5,645,949 to Young, entitled Battery Cell Having An Internal Circuit For Controlling Its Operation, U.S. Pat. No. 5,582,928 to Farley, entitled Supply Batteries, U.S. Pat. No. 5,477,129 to Myslinsid, entitled Charge Level Display Method And Apparatus For A Battery Of AN Electronic Device, U.S. Pat. No. 5,496,658 to Hein et al., entitled Storage Battery State-Of Charge Indicator, U.S. Pat. No. 5,339,024 to Kuo et al., entitled Battery With Electrochemical Tester, and U.S. Pat. No. 5,389,458 to Weiss et al., entitled Battery With Tester Label And Method For Producing It.

SUMMARY OF THE INVENTION

Accordingly, the present invention has been made keeping in mind the above problems occurring in the earlier arrangement, and an object of the present invention is to provide a portable electronic appliance, such as a portable computer, which has a switching device capable of allowing a user to easily check the battery capacity of the portable electronic appliance outside of the appliance without removing the battery from the portable electronic appliance, thus being convenient to the user.

In order to accomplish the above object, the present invention provides a portable electronic appliance, comprising: a main body; a battery receiving room disposed within the main body; a battery detachably installed in the battery receiving room; and a switching device, disposed on the battery receiving room, for allowing a user to check a battery capacity outside of the appliance without separating the battery from the appliance. The battery has a battery checking switch and a capacity display on one surface, the battery checking switch being selectively operated outside of the appliance and the capacity display being selectively operated in conjunction with the battery checking switch so as to display the battery capacity thereon. The switching device of the battery receiving room is provided at a position corresponding to the battery checking switch of the battery. In addition, a window is formed on the battery receiving room at a position corresponding to the capacity display, thus allowing a user to check the battery capacity outside of the appliance.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
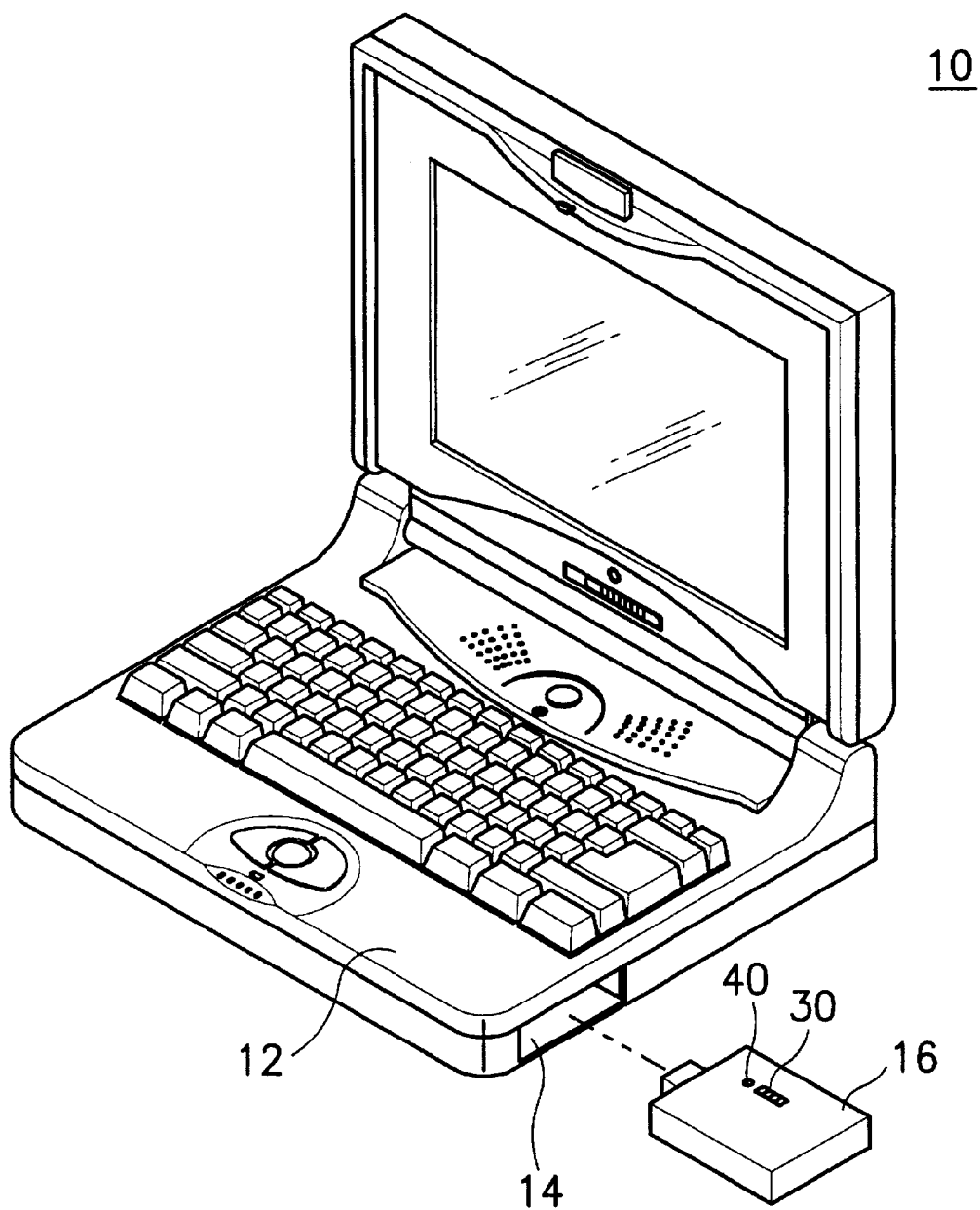
FIG. 1 is a perspective view of an earlier portable computer.

FIG. 1 is a view illustrating the construction of the earlier portable computer discussed above in the Description of the Related Art.

The portable computer 10 of FIG. 1 includes a main body 12, a battery receiving room 14 formed within the main body and a battery 16 installed in the battery receiving room 14. The battery 16 may include a battery checking switch 40 and a capacity display 30 mounted on a surface thereof.

It is noted, however, that the battery 16 must be removed from the portable computer 10 in order that the battery checking switch 40 be operated and the capacity display 30 read.

Figure 2:
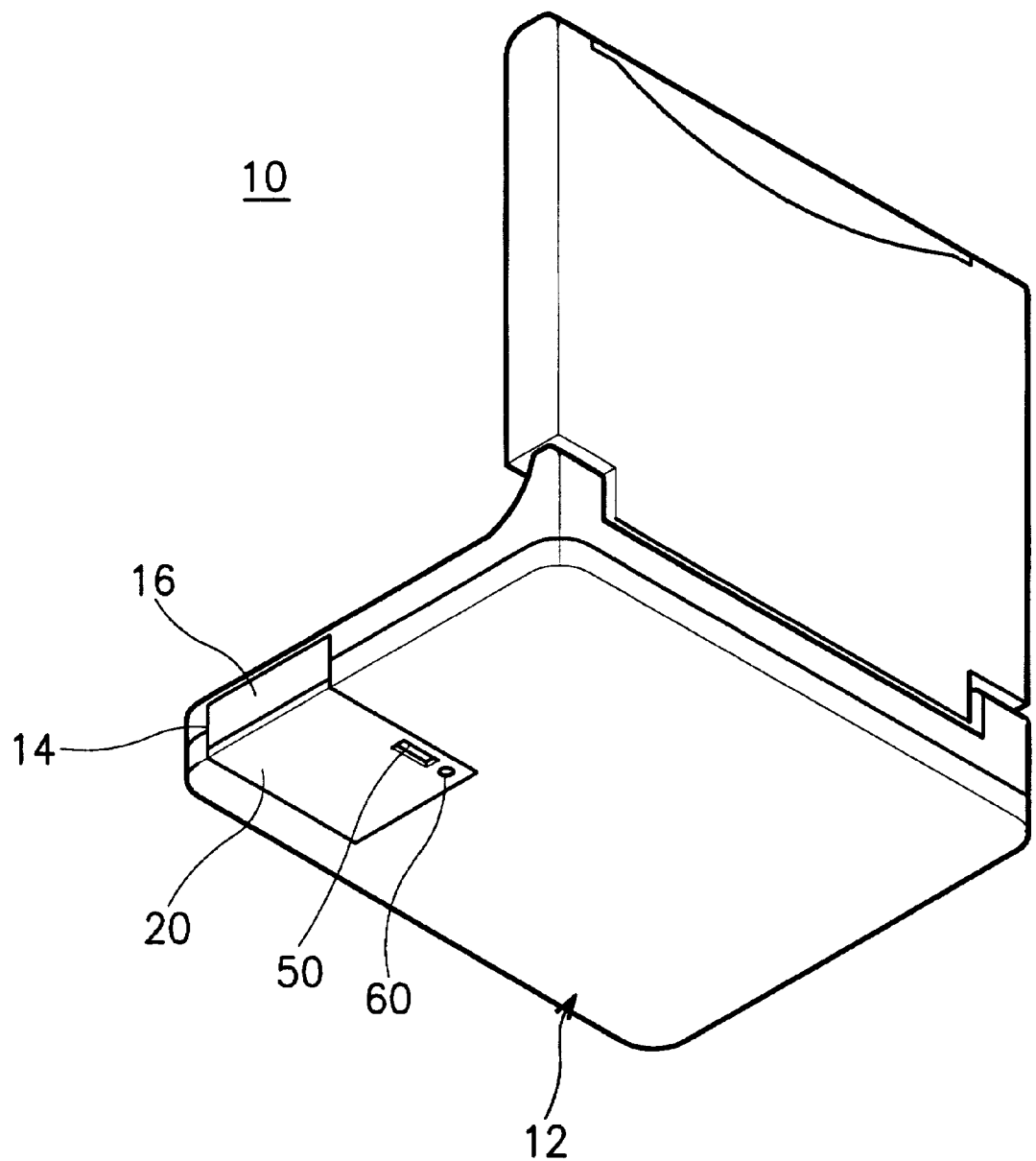
FIG. 2 is a bottom perspective view of a portable computer in accordance with the preferred embodiment of the present invention.
Figure 3:
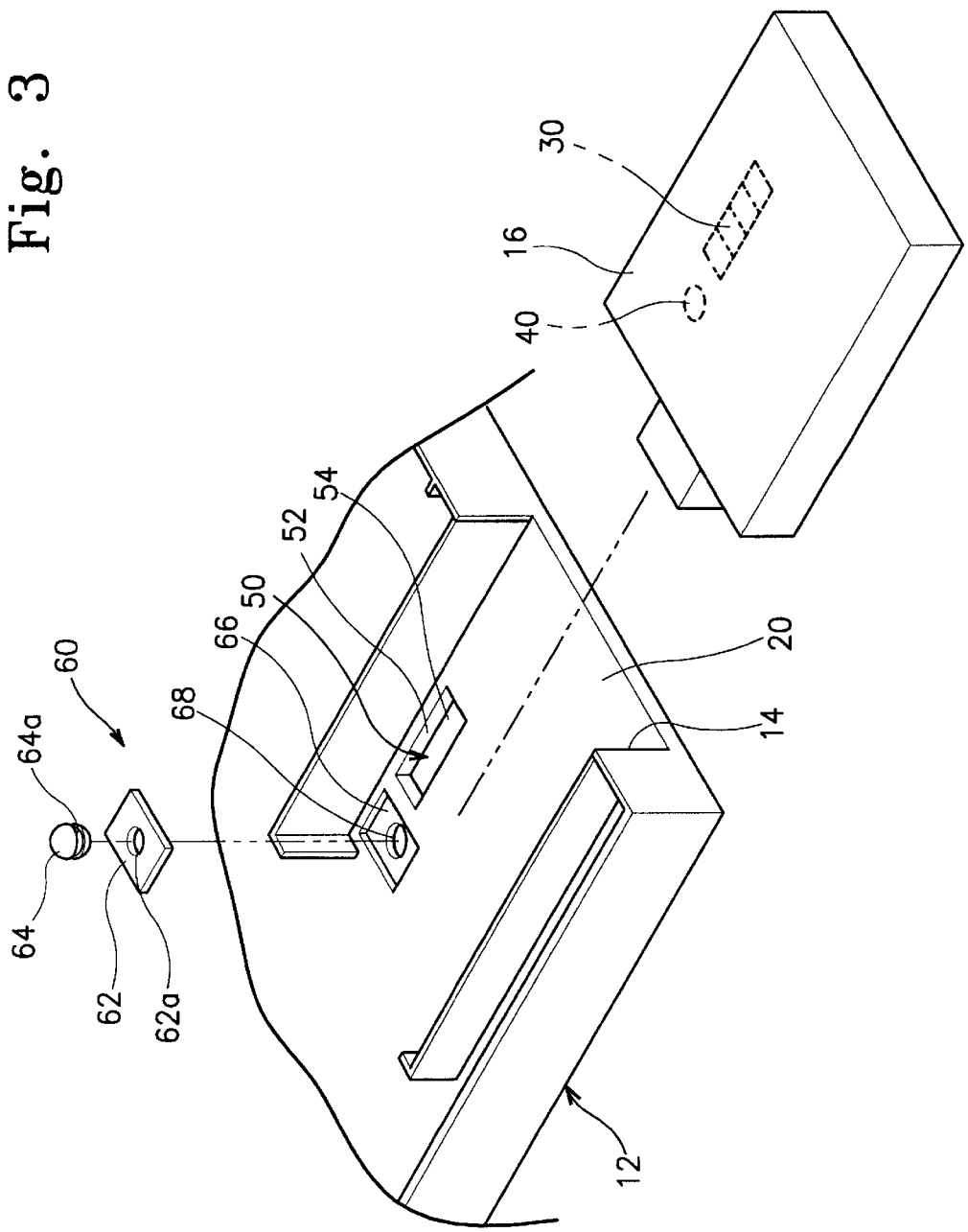
FIG. 3 is an exploded perspective view showing the construction of the portable computer of the present invention.

FIGS. 2 and 3 are views illustrating the construction of a portable computer in accordance with the preferred embodiments of the present invention.

As shown in FIGS. 2 and 3, the portable computer 10 comprises a main body 12 with a battery receiving room 14. A battery 16 is detachably installed in the receiving room 14. The battery 16 includes both a capacity display 30 and a battery checking switch 40 at its bottom surface. That is, the capacity of the battery 16 can be displayed on the display 30 in accordance with a switching action of the battery checking switch 40. The battery checking switch 40 is operated outside the computer 10.

A panel 20, forming the bottom wall of the receiving room 14, has a window 50. The position of the window 50 is mated with that of the capacity display 30 of the battery 16 when the battery 16 is inserted into the battery receiving room 14 of the computer 10. Also, a switching device 60 is mounted to the panel 20 at a position corresponding to the battery checking switch 40 of a battery 16. The switching device 60 is designed to be elastically operated by a user outside the computer 10. When the switching device 60 is elastically pushed by a user outside the computer 10, the device 60 switches the battery checking switch 40 of the battery 16 on, thus allowing the capacity of the battery 16 to be displayed on the display 30.

Figure 4:
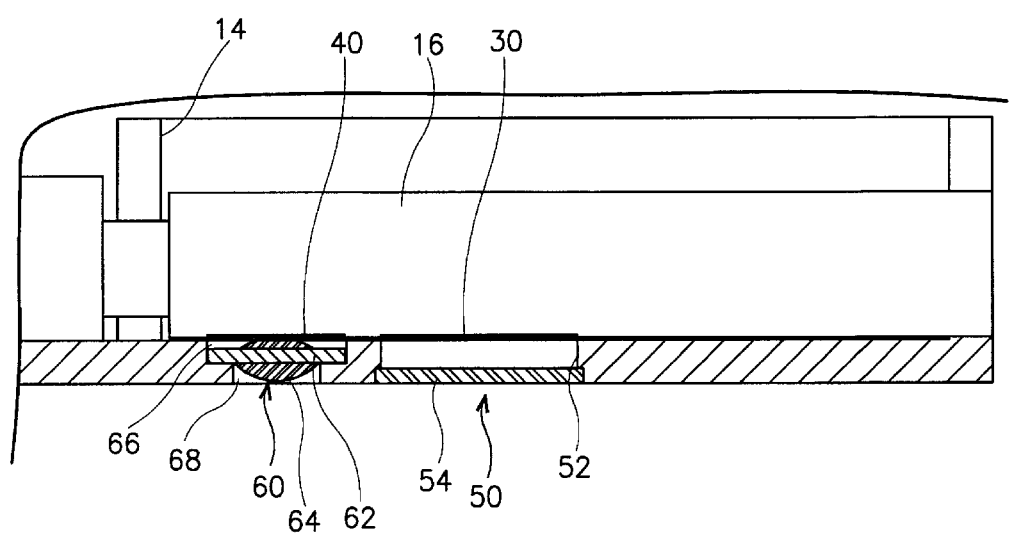
FIG. 4 is a cross-sectional view showing the operation of the portable computer of this invention.

The switching device 60 comprises a mounting plate 62 and a button 64. The mounting plate 62 has a mounting hole 62a at its central portion and is mounted to the panel 20. The button 64, mounted to the mounting plate 62 and having an egg-shaped configuration, has an annular fitting groove 64a at the circumference. Thus, when the button 64 is inserted into the mounting hole 62a of the plate 62, the edge of the mounting hole 62a is fitted into the groove 64a of the button 64, thus firmly holding the button 64 with both ends of the button 64 respectively protruding from the top and bottom surfaces of the plate 62 as best shown in FIG. 4.

A mounting recess 66 is formed on the panel 20, while an opening 68 is formed on the central portion of the mounting recess 66. The mounting plate 62 is seated in the recess 66 with the button 64 being inserted into the opening 68, so it is possible to operate the button 64 outside of the computer 10.

In the preferred embodiment of this invention, the button 64 is made of an elastic material, such as a rubber, so the battery checking switch 40 is pushed by an elastic pushing force of the button 64 when the button 64 is pushed by a user outside the computer 10. When an external pushing force is removed from the button 64, the button 64 is restored to its original shape by its restoring force and switches the battery checking switch 40 off.

The window 50 includes a large hole 52 and a transparent plate 54. The large hole 52 is formed on the panel 20, while the transparent plate 54 is set to the edge of the large hole 52 in such a manner that a user can see the capacity display 30 through the transparent plate 54 at the outside of the computer 10. Preferably, the transparent plate 54 is made of a synthetic resin, such as an acrylic resin.

The operational effect of the computer 10 according to the preferred embodiment of this invention is described below. FIG. 4 is a cross-sectional view of the portable computer 10 in accordance with the preferred embodiment of this invention.

When it is necessary to check the battery capacity of the computer 10, a user pushes the outside end of the button 64 at the outside of the computer 10 as shown in FIG. 4. The inside end of the button 64 thus pushes the battery checking switch 40, so the battery checking switch 40 is switched on. As a result, the capacity display 30 is turned on by the battery checking switch 40, so the battery capacity of the computer 10 is displayed on the display 30. Therefore, the user can easily check the capacity of the battery 16 of the portable computer 10 outside of the computer 10 without removing the battery 16 from the computer 10.

As mentioned above, the portable electronic appliance, such as a portable computer, of this invention is provided with a switching device capable of allowing a user to easily check the battery capacity of the portable electronic appliance outside of the appliance without removing the battery from the appliance. That is, a user can easily know the capacity of the battery contained within the portable electronic appliance by a simple operation of the switching device, so the device is convenient to the user of the portable electronic appliance.

Although the preferred embodiments of the present invention have been disclosed for illustrative purposes, those skilled in the art will appreciate that various modifications, additions and substitutions are possible, without departing from the scope and spit of the invention as disclosed in the accompanying claims.

What is claimed is:

1. A portable electronic appliance, comprising:
   a main body;
   a battery receiving room disposed within said main body
   a battery detachably installed in said battery receiving room, said battery comprising a battery checking switch and a capacity display on one surface of said battery, said battery checking switch being selectively operated outside of the appliance and said capacity display being selectively operated in conjunction with the battery checking switch to display a battery capacity of said battery; and
   a switching device, disposed on said battery receiving room, for allowing a user to check said battery capacity outside of the appliance without removing the battery from the appliance, said switching device being provided at a position corresponding to said battery checking switch of the battery so that operation of said switching device operates said batter checking switch.

2. The appliance as claimed in claim 1, further comprising a window disposed on said battery receiving room at a position corresponding to said capacity display, the window allowing a user to check the battery capacity outside of the appliance by viewing said capacity display through said window.

3. A portable electronic computer, comprising:
   a main body;
   a battery receiving room disposed within said main body to accommodate detachable installation in said battery receiving room of a battery having a battery checking switch and a capacity display on one surface of the battery, the battery check switch being selectively operable when the battery is outside said battery receiving room and the capacity display being selectively operated in conjunction with the battery check switch to display a battery capacity; and a switching device, disposed on said battery receiving room at a position corresponding to the battery checking switch of the battery so that operating said switching device operates the battery checking switch of a battery within said battery receiving room, for allowing a user to check said battery capacity outside of the computer without removing the battery from the computer.

4. The computer as claimed in claim 3, further comprising a window disposed on said battery receiving room at a position corresponding to said capacity display, the window allowing a user to check the battery capacity outside of the computer by viewing said capacity display through said window.

5. The appliance as claimed in claim 1, said switching device comprising an egg-shaped resilient button having an annular fitting groove disposed at the circumference thereof and having a mounting plate containing a mounting aperture, an edge of the mounting aperture being fitted into the annular fitting groove of the button so as to firmly hold the button while allowing both ends of the button to respectively protrude from either surface of the plate.

6. The appliance as claimed in claim 1, said switching device comprising a button having an annular fitting groove disposed at the circumference and a mounting plate containing a mounting aperture, an edge of the mounting aperture being fitted into the annular fitting groove while allowing both ends of the button to respectively protrude from either surface of the plate.

7. The appliance as claimed in claim 2, said switching device comprising an egg-shaped resilient button having an annular fitting groove disposed at the circumference thereof and having a mounting plate containing a mounting aperture, an edge of the mounting aperture being fitted into the annular fitting groove of the button so as to firmly hold the button while allowing both ends of the button to respectively protrude from either surface of the plate.

8. The computer as claimed in claim 3, said switching device comprising an egg-shaped resilient button having an annular fitting groove disposed at the circumference thereof and having a mounting plate containing a mounting aperture, an edge of the mounting aperture being fitted into the annular fitting groove of the button so as to firmly hold the button while allowing both ends of the button to respectively protrude from either surface of the plate.

9. The computer as claimed in claim 3, said switching device comprising a button having an annular fitting groove disposed at the circumference and a mounting plate containing a mounting aperture, an edge of the mounting aperture being fitted into the annular fitting groove while allowing both ends of the button to respectively protrude from either surface of the plate.

10. The computer as claimed in claim 4, said switching device comprising an egg-shaped resilient button having an annular fitting groove disposed at the circumference thereof and having a mounting plate containing a mounting aperture, an edge of the mounting aperture being fitted into the annular fitting groove of the button so as to firmly hold the button while allowing both ends of the button to respectively protrude from either surface of the plate.

11. The appliance as claimed in claim 5, said button comprising an egg-shaped rubber button.

12. The appliance as claimed in claim 6, said button comprising an egg-shaped rubber button.

13. The appliance as claimed in claim 7, said button comprising an egg-shaped rubber button.

14. The computer as claimed in claim 8, said button comprising an egg-shaped rubber button.

15. The computer as claimed in claim 9, said button comprising an egg-shaped rubber button.

16. The computer as claimed in claim 10, said button comprising an egg-shaped rubber button.

17. The appliance as claimed in claim 2, said window comprising a transparent plate composed of a synthetic resin.

18. The computer as claimed in claim 4, said window comprising a transparent plate composed of a synthetic resin.

* * * * *